Dec. 29, 1925.
T. C. WHITEHEAD
1,567,218
AUXILIARY WHEEL RIM
Filed July 5, 1924
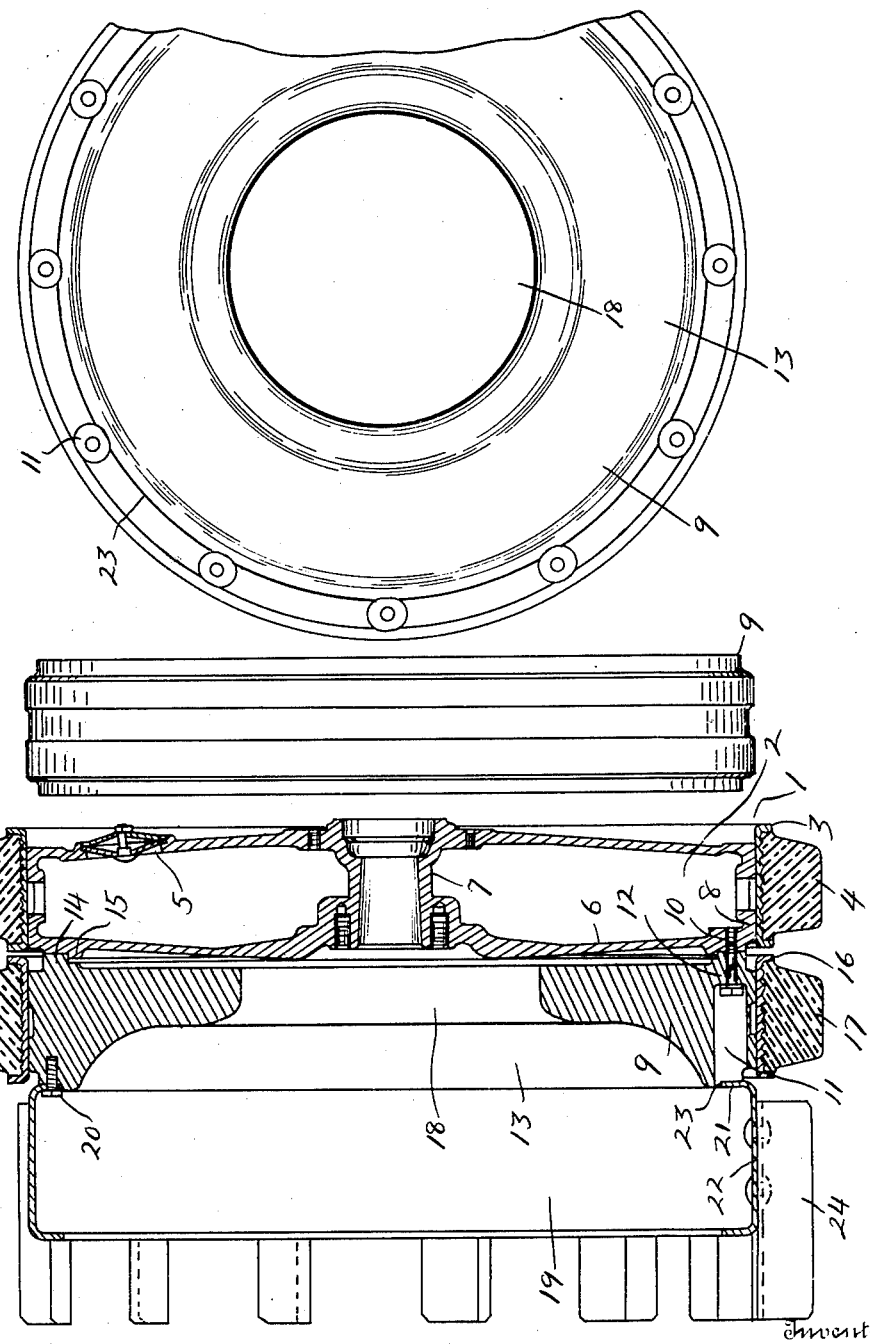
Inventor
Thomas C. Whitehead
By Whittemore Hulbert Whittemore
& Belknap   Attorneys Patented Dec. 29, 1925.

1,567,218

UNITED STATES PATENT OFFICE.

THOMAS C. WHITEHEAD, OF DETROIT, MICHIGAN.

AUXILIARY WHEEL RIM.

Application filed July 5, 1924. Serial No. 724,529.

*To all whom it may concern:*

Be it known that I, THOMAS C. WHITEHEAD, a citizen of the United States of America, residing at Detroit, in the county of Wayne and State of Michigan, have invented certain new and useful Improvements in Auxiliary Wheel Rims, of which the following is a specification, reference being had therein to the accompanying drawings.

This invention relates generally to vehicle wheels and refers more particularly to weighted wheels for tractors and the like.

One of the essential objects of the invention is to provide a strong and durable weighted wheel having a detachable weighted lateral extension to improve its traction.

Another object is to provide an extension of this type that is preferably seated upon a suitable pilot projecting from one side of the weighted wheel and is preferably equal in diameter to the diameter of the wheel body whereby the tire rims for the weighted wheel and the weighted extension are interchangeable.

A further object is to provide a strong and durable auxiliary cleated rim which is preferably centered upon one side of the weighted extension so that the cleats of the auxiliary rim will be prevented from engaging a hard surface or pavement but will secure the necessary traction when the weighted wheel and extension sink into soft, muddy and sandy ground.

With the above and other objects in view the invention consists in certain novel features of construction, combinations and arrangements of parts as will be more fully described and particularly pointed out in the appended claims.

In the accompanying drawing:

Figure 1 is a vertical sectional view of a vehicle wheel embodying my invention and showing the weighted extension and cleated rim attached thereto.

Figure 2 is an end elevation of the weighted extension.

Figure 3 is a side elevation of the weighted extension.

Referring now to the drawing in which like characters of reference designate corresponding parts throughout the several views the numeral 1 designates a vehicle wheel having a hollow body 2 and a flanged rim 3 that surrounds the body and preferably holds a suitable solid tire 4.

Any suitable material (not shown) may be introduced into the hollow body 2 of the wheel through a suitable opening 5 in one of the disk members 6 connecting the hub 7 and rim 8 for increasing the weight of the wheel to improve its traction.

For further improving the traction of the wheel, I preferably provide a relatively wide circular cast iron extension weight 9 which is preferably attached to one of the disk members 6 of the wheel. In order that relatively short and light bolts 10 will suffice for securing the weighted extension 9 to the wheel, the extension is preferably provided near its periphery with the series of spaced transversely extending sockets 11 which permit the bolts 10 to engage only relatively thin portions 12 of the extension weight. The extension weight is also preferably centrally dished upon its outer side as shown at 13 and is provided upon its inner side with an annular flange 14 that seats upon an annular shoulder or pilot 15 which takes the weight of the extension 9 and thereby relieves the bolts 10 of any shearing stresses and strains to which they would otherwise be subjected. As shown, the extension weight 9 is preferably equal in diameter to the diameter of the wheel body 2 and is surrounded by a flanged rim 16 and a tire 17 corresponding to the rim 3 and tire 4. Thus, the wheel and extension may be equipped with standard tire rims which are interchangeable. Moreover the arrangement is such that the combined tread surface of the tires 4 and 17 will afford the desired traction on hard surfaces or pavements without the necessity of providing double wheel constructions which necessarily are decidedly more expensive to manufacture and do not possess sufficient weight to obtain the proper traction. Furthermore the laterally spaced tires will tend to prevent the vehicle from skidding and slipping over hard surfaces or pavements.

In order that the usual hub cap (not shown) for the wheel may be accessible when the extension 9 is attached to the wheel, the dished portion 13 of the extension is preferably provided with a central opening 18 that is in alignment with the wheel hub 7.

For obtaining the necessary traction when the weighted wheel and rim sink into soft, muddy or sandy ground I preferably provide a suitable channel shaped cleated rim 19 that is preferably attached to the outer face of the weighted extension 9 by means of the bolts 20.

As shown, the inner flange 21 of the rim proper 22 preferably seats upon a suitable annular pilot 23 projecting laterally from the outer face of the weighted extension 9 and the diameter of the rim proper 22 is preferably equal to the diameter of the extension 9 however the tread diameter of the cleated rim 19 is preferably sufficiently less than the tread diameter of the tires 4 and 17 to prevent the cleats 24 from engaging the hard surface or pavement over which the tractor may be driven.

While it is believed that from the foregoing description the nature and advantages of the invention will be readily apparent, I desire to have it understood that I do not limit myself to what is herein shown and described, and that such changes may be resorted to when desired as fall within the scope of what is claimed.

What I claim as my invention is:

1. The combination with a vehicle wheel, of a weighted lateral extension for said wheel having transversely extending sockets therein providing relatively thin portions adjacent to said wheel, and headed elements engaging said thin portions and securing said extension to said wheel.

2. The combination with a vehicle wheel, of a solid weight constituting a lateral extension for said wheel, means for detachably securing said weight to one side of said wheel, and means for relieving said securing means of shearing stresses and strains.

3. The combination with a vehicle wheel, of a weighted lateral extension for said wheel, headed elements extending transversely of said extension securing the same to one side of said wheel, an annular flange projecting from said extension, and an annular flange projecting from said wheel forming a seat or pilot for the annular flange aforesaid to relieve said headed elements of shearing stresses and strains.

4. The combination with a rubber tired wheel, of a rubber tired lateral extension detachably secured to one side of said wheel, and a cleated auxiliary rim detachably secured to one side of said extension, the tread diameter of said extension being substantially equal to that of said wheel, and the tread diameter of said cleated rim being less than the respective tread diameters of said wheel and extension.

5. The combination with a vehicle wheel, of a weighted lateral extension detachably secured to said wheel, a flange projecting from one side of said extension, a flange projecting from said wheel forming a seat for the flange aforesaid, and an auxiliary cleated rim detachably seated upon the opposite side of said extension.

6. The combination with a vehicle wheel, of a solid weight secured to said wheel constituting a lateral weighted extension therefor and having a seat at one side thereof, and a cleated auxiliary rim mounted on the seat aforesaid of said extension.

7. The combination with a wheel body having a rim and hub, and a disc extending between said hub and rim, of a cast metal annulus constituting a lateral weighted extension for the wheel body secured to said disc, the diameter of said wheel body and annulus being substantially equal whereby interchangeable rims may be sleeved upon said wheel body and annulus.

8. The combination with a wheel body having a hub, of a relatively wide cast metal body projecting laterally from the wheel body having a transversely extending opening in substantial registration with the central portion of the wheel body to give access to the hub of said wheel body.

9. The combination with a wheel body having a tire rim thereon, and a solid weight constituting a lateral extension of said wheel body, the respective diameters of the wheel body and weight being substantially equal whereby the tire rims for the wheel body and extension are interchangeable.

10. The combination with a wheel body, of a metallic weighted body constituting a lateral extension for said wheel body, and means extending transversely of said weighted body for securing the same to said wheel body.

11. The combination with a wheel body, of an annular solid body constituting a lateral extension for said wheel body, and means for securing said annular body to said wheel body including headed elements extending transversely of said annular body.

In testimony whereof I affix my signature.

THOMAS C. WHITEHEAD.